United States Patent
Adhikari et al.

(10) Patent No.: US 9,280,849 B2
(45) Date of Patent: *Mar. 8, 2016

(54) AUGMENTED REALITY INTERFACE FOR VIDEO TAGGING AND SHARING

(75) Inventors: Suranjit Adhikari, San Diego, CA (US); Ted Dunn, Carlsbad, CA (US); Eric Hsiao, San Diego, CA (US)

(73) Assignee: Sony Corporation, Tokyo (JP)

( * ) Notice: Subject to any disclaimer, the term of this patent is extended or adjusted under 35 U.S.C. 154(b) by 111 days.

This patent is subject to a terminal disclaimer.

(21) Appl. No.: 13/291,851

(22) Filed: Nov. 8, 2011

(65) Prior Publication Data

US 2012/0113274 A1    May 10, 2012

Related U.S. Application Data

(60) Provisional application No. 61/411,053, filed on Nov. 8, 2010.

(51) Int. Cl.
| | |
|---|---|
| *G06T 19/00* | (2011.01) |
| *G06Q 30/06* | (2012.01) |
| *G09G 5/00* | (2006.01) |

(52) U.S. Cl.
CPC .......... *G06T 19/006* (2013.01); *G06Q 30/0623* (2013.01); *G09G 5/00* (2013.01); *G09G 2340/12* (2013.01); *G09G 2340/125* (2013.01); *G09G 2340/14* (2013.01); *G09G 2354/00* (2013.01)

(58) Field of Classification Search
CPC .............................. G06T 19/006; G06F 3/011
USPC .......................................... 345/419, 632, 633
See application file for complete search history.

(56) References Cited

U.S. PATENT DOCUMENTS

| | | | |
|---|---|---|---|
| 7,073,129 B1 | 7/2006 | Robarts | |
| 7,853,296 B2 | 12/2010 | Yu | |
| 2004/0212630 A1 | 10/2004 | Hobgood | |
| 2006/0038833 A1 | 2/2006 | Mallinson | |
| 2006/0232499 A1 | 10/2006 | Ebersole | |
| 2009/0054084 A1* | 2/2009 | Buhrke et al. ............. | 455/456.3 |
| 2009/0248300 A1* | 10/2009 | Dunko et al. ................ | 701/209 |

(Continued)

OTHER PUBLICATIONS

Mixed Reality: A Survey, appearing in Human Machine Interaction. Enrico Constanza and Andreas Kunz and Morten Fjeld. vol. LNCS 5440. Berlin: Springer, (May 2009). 47-68.*

(Continued)

*Primary Examiner* — Xiao Wu
*Assistant Examiner* — Scott E Sonners
(74) *Attorney, Agent, or Firm* — Fitch, Even, Tabin & Flannery LLP

(57) ABSTRACT

A system, method, and computer program product for automatically combining computer-generated imagery with real-world imagery in a portable electronic device by retrieving, manipulating, and sharing relevant stored videos, preferably in real time. A video is captured with a hand-held device and stored. Metadata including the camera's physical location and orientation is appended to a data stream, along with user input. The server analyzes the data stream and further annotates the metadata, producing a searchable library of videos and metadata. Later, when a camera user generates a new data stream, the linked server analyzes it, identifies relevant material from the library, retrieves the material and tagged information, adjusts it for proper orientation, then renders and superimposes it onto the current camera view so the user views an augmented reality.

19 Claims, 8 Drawing Sheets

(56) References Cited

U.S. PATENT DOCUMENTS

| | | |
|---|---|---|
| 2010/0309225 A1 | 12/2010 | Gray |
| 2011/0164163 A1 | 7/2011 | Bilbrey |
| 2011/0234631 A1 | 9/2011 | Kim |
| 2012/0113142 A1 | 5/2012 | Adhikari |
| 2012/0113143 A1 | 5/2012 | Adhikari |
| 2012/0113144 A1 | 5/2012 | Adhikari |
| 2012/0113145 A1 | 5/2012 | Adhikari |
| 2012/0114297 A1 | 5/2012 | Adhikari |
| 2012/0116920 A1 | 5/2012 | Adhikari |
| 2012/0120101 A1 | 5/2012 | Adhikari |

OTHER PUBLICATIONS

A Survey of Augmented Reality Technologies, Applications and Limitations The International Journal of Virtual Reality, vol. 9, No. 2. (Jun. 2010), pp. 1-20 by D. W. F. van Krevelen, R. Poelman.*
Gotow, J. Benjamin, Krzyszt Zienkiewicz, Jules White, and Douglas C. Schmidt. "Addressing Challenges with AR Applications on Smartphones." Lecture Notes of the Institute for Computer Sciences, Social Informatics and Telecommunications Engineering 48 (Jul. 2, 2010): 129-43.*
Gammeter, Stephan, Alexander Gassmann, Lukas Bossard, Till Quack, and Luc Van Gool. "Server-side Object Recognition and Client-side Object Tracking for Mobile Augmented Reality." Computer Vision and Pattern Recognition Workshops (CVPRW), 2010 IEEE Computer Society Conference (Jun. 2010): 1-8. IEEE Xplore.*
Takacs, Gabriel, et al. "Outdoors augmented reality on mobile phone using loxel-based visual feature organization." Proceedings of the 1st ACM international conference on Multimedia information retrieval. ACM, 2008.*
USPTO; Office Action issued in U.S. Appl. No. 13/291,836, mailed Jan. 15, 2014, 43 pages.
USPTO; Office Action issued in U.S. Appl. No. 13/291,951, mailed Jan. 15, 2014, 52 pages.
USPTO; Advisory Action & Examiner-Initiated Interview Summary issued in U.S. Appl. No. 13/291,866, mailed Dec. 12, 2013, 5 pages.
USPTO; Advisory Action issued in U.S. Appl. No. 13/291,836, mailed Dec. 6, 2013, 3 pages.
USPTO; Advisory Action issued in U.S. Appl. No. 13/291,903, mailed Dec. 20, 2013, 3 pages.
USPTO; Advisory Action issued in U.S. Appl. No. 13/291,918, mailed Dec. 20, 2013, 3 pages.
USPTO; Advisory Action issued in U.S. Appl. No. 13/291,951, mailed Dec. 24, 2013, 3 pages.
USPTO; Final Office Action issued in U.S. Appl. No. 13/291,930, mailed Dec. 5, 2013, 46 pages.
"AroundMe", AroundMe, archive of Jun. 22, 2011 http://www.aroundmeapp.com/, pp. 1-2.
"Augmented Reality", Layar, archive of Sep. 4, 2013 https://www.layar.com/augmented-reality/, pp. 1-3.
"Layar revolutionizes Mobile Content Discovery with new Stream Technology powered browser" brochure, Layar, archive of Jun. 2, 2010 http://site.layar.com/company/blog/layar-revolutionizes-mobile-content-discovery/, pp. 1-6.
"The easiest way to add Augmented Reality in your app.", archive of Nov. 17, 2010 http://site.layar.com/company/blog/the-easiest-way-to-add-augmented-reality-in-your-app/, pp. 1-4.
"Tweakersoft", Tweakersoft, archive of Nov. 29, 2010 http://tweakersoft.com/, 1 page.
Belimpasakis, Petros., et al; "Enabling Rapid Creation of Content for Consumption in Mobile Augmented Reality", 2010 Fourth International Conference on Next Generation Mobile Applications, Services and Technologies (NGMAST 2010), Jul. 27-29, 2010, pp. 1-6.
Capin, Tolga, et al.; "The State of the Art in Mobile Graphics Research", IEEE Computer Graphics and Applications, vol. 28, No. 4, Jul./Aug. 2008, pp. 74-84.
Gotow, J. Benjamin, et al.; "Addressing Challenges with Augmented Reality Applications on Smartphones", Mobile Wireless Middleware, Operating Systems, and Applications, Lecture Notes of the Institute for Computer Sciences, Social Informatics and Telecommunications Engineering vol. 48, 2010, pp. 1-14.
Klein, Georg, et al.; "Parallel Tracking and Mapping on a Camera Phone", 8th (IEEE) and (ACM) International Symposium on Mixed and Augmented Reality, 2009, pp. 1-4.
Rosten, Edward, et al.; "Faster and better: a machine learning approach to corner detection", IEEE Trans. Pattern Analysis and Machine Intelligence, 2010, pp. 1-15.
Rosten, Edward, et al.; "Machine learning for high-speed corner detection", European Conference on Computer Vision, May 2006, pp. 1-14.
USPTO; Final Office Action issued in U.S. Appl. No. 13/291,836, mailed Sep. 18, 2013, 33 pages.
USPTO; Final Office Action issued in U.S. Appl. No. 13/291,866, mailed Sep. 18, 2013, 55 pages.
USPTO; Final Office Action issued in U.S. Appl. No. 13/291,886, mailed Oct. 21, 2013, 47 pages.
USPTO; Final Office Action issued in U.S. Appl. No. 13/291,903, mailed Oct. 10, 2013, 49 pages.
USPTO; Final Office Action issued in U.S. Appl. No. 13/291,918, mailed Oct. 11, 2013, 58 pages.
USPTO; Final Office Action issued in U.S. Appl. No. 13/291,951, mailed Oct. 10, 2013, 36 pages.
USPTO; Office Action issued in U.S. Appl. No. 13/291,866, mailed Mar. 28, 2013, 34 pages.
USPTO; Office Action issued in U.S. Appl. No. 13/291,836, mailed Mar. 28, 2013, 31 pages.
USPTO; Office Action issued in U.S. Appl. No. 13/291,886, mailed Jun. 19, 2013, 41 pages.
USPTO; Office Action issued in U.S. Appl. No. 13/291,903, mailed Jun. 19, 2013, 44 pages.
USPTO; Office Action issued in U.S. Appl. No. 13/291,918, mailed Jun. 19, 2013, 53 pages.
USPTO; Office Action issued in U.S. Appl. No. 13/291,930, mailed Jul. 31, 2013, 39 pages.
USPTO; Office Action issued in U.S. Appl. No. 13/291,951, mailed Jun. 19, 2013, 37 pages.
Wikipedia; "AroundMe" archive from May 6, 2010 of http://en.wikipedia.org/w.index.php?title=AroundMe&oldid=360610438, pp. 1-2.
Gammeter, Stephan, et al.; "Server-side object recognition and client-side object tracking for mobile augmented reality", Computer Vision and Pattern Recognition Workshops (CVPRW), 2010 IEEE Computer Society Conference on. IEEE Jun. 13-18, 2010.
Takacs, Gabriel, et al.; "Outdoors Augmented Reality on Mobile Phone Using Loxel-Based Visual Feature Organization"; Proceedings of the 1st ACM International Conference on Multimedia Information Retrieval; ACM, 2008.
USPTO; Advisory Action issued in U.S. Appl. No. 13/291,930, mailed Feb. 20, 2014, 3 pages.
USPTO; Office Action issued in U.S. Appl. No. 13/291,866, mailed Mar. 26, 2014, 57 pages.
USPTO; Office Action issued in U.S. Appl. No. 13/291,886, mailed Feb. 25, 2014, 55 pages.
USPTO; Office Action issued in U.S. Appl. No. 13/291,903, mailed Feb. 24, 2014, 56 pages.
USPTO; Office Action issued in U.S. Appl. No. 13/291,930, mailed Apr. 9, 2014, 67 pages.
USPTO; Final Office Action issued in U.S. Appl. No. 13/291,836, mailed Jul. 1, 2014, 48 pages.
USPTO; Final Office Action Issued in U.S. Appl. No. 13/291,886, mailed Jun. 12, 2014, 59 pages.
USPTO; Final Office Action issued in U.S. Appl. No. 13/291,903, mailed Jun. 13, 2014, 58 pages.
USPTO; Final Office Action issued in U.S. Appl. No. 13/291,918, mailed Jun. 16, 2014, 66 pages.
USPTO; Final Office Action issued in U.S. Appl. No. 13/291,951, mailed Jul. 1, 2014, 52 pages.
USPTO; Final Office Action issued in U.S. Appl. No. 13/291,930, mailed Nov. 3, 2014, 76 pages.
USPTO; Final Office Action issued in U.S. Appl. No. 13/291,866, mailed Oct. 17, 2014, 72 pages.

(56) References Cited

OTHER PUBLICATIONS

USPTO; Office Action issued in U.S. Appl. No. 13/291,836, mailed Nov. 19, 2014, 29 pages.
USPTO; Office Action issued in U.S. Appl. No. 13/291,886, mailed Oct. 6, 2014, 33 pages.
USPTO; Office Action issued in U.S. Appl. No. 13/291,903, mailed Oct. 31, 2014, 34 pages.
USPTO; Office Action issued in U.S. Appl. No. 13/291,918, mailed Oct. 2, 2014, 34 pages.
USPTO; Office Action issued in U.S. Appl. No. 13/291,951, mailed Dec. 3, 2014, 30 pages.
USPTO; Applicant-Initiated Interview Summary issued in U.S. Appl. No. 13/291,866, mailed May 22, 2015, 4 pages.
USPTO; Final Office Action issued in U.S. Appl. No. 13/291,836 mailed Mar. 16, 2015, 32 pages.
USPTO; Final Office Action issued in U.S. Appl. No. 13/291,886 mailed Apr. 21, 2015, 31 pages.
USPTO; Final Office Action issued in U.S. Appl. No. 13/291,903 mailed Apr. 21, 2015, 28 pages.
USPTO; Final Office Action issued in U.S. Appl. No. 13/291,918 mailed Apr. 21, 2015, 32 pages.
USPTO; Final Office Action issued in U.S. Appl. No. 13/291,951 mailed Apr. 21, 2015, 32 pages.
USPTO; Office Action issued in U.S. Appl. No. 13/291,866, mailed Mar. 9, 2015, 26 pages.
USPTO; Office Action issued in U.S. Appl. No. 13/291,930, mailed Mar. 3, 2015, 27 pages.
USPTO; Notice of Allowance issued in U.S. Appl. No. 13/291,930, mailed Oct. 1, 2015, 11 pages.
USPTO: Notice of Allowance issued in U.S. Appl. No. 13/291,903, mailed Sep. 23, 2015, 11 pages.
USPTO; Notice of Allowance issued in U.S. Appl. No. 13/291,836, mailed Sep. 23, 2015, 11 pages.
USPTO; Notice of Allowance issued in U.S. Appl. No. 13/291,866 mailed Sep. 23, 2015, 11 pages.
USPTO; Notice of Allowance issued in U.S. Appl. No. 13/291,918, mailed Sep. 23, 2015, 11 pages.
USPTO: Notice of Allowance issued in U.S. Appl. No. 13/291,886 mailed Jan. 14, 2016, 11 pages.

* cited by examiner

FIG. 2

```
Filtered (p_i) =
    if size(R) < |R| ; enqueue(R, p_i)
    else:
    z_i=Z(p_i)
    if abs(Zi) <= Zrange :
        enqueue(R, p_i)
        clear(O)
    else: enqueue (O, p_i)
if size(O)=|O|:
    direction= outlierCluster()
    for all p_j in O
        if outlierDirection (p_j) = direction;
        enqueue(R, p_j)
        clear (O)
        return mean (R)
    outlierCluster()=
                int sum=O
                for all p_j in O
                sum+= p_j - mean(R)
                return signum(sum)
```

R= Ring Buffer of Received Data
O= Ring Buffer of Outlier Data
|R|= |O|= Maximum Allowable Size of the buffer
Size(buffer)= ReturnCurrentSizeofBuffer
$p_i$ = The compass reading as a single precision float
$z(p_i) = (p_i - \text{mean}(R)) / \text{standard deviation}(R)$
Zrange = Maximum allowable deviation
outlierDirectlon($p_i$) = $p_i$ > mean(R) ? 1:-1
enqueue(buffer,$p_i$) = Adds $p_i$ to the Buffer

AUGMENTED REALITY INTERFACE FOR VIDEO TAGGING AND SHARING

CROSS-REFERENCE TO RELATED APPLICATIONS

This application claims the benefit under 35 U.S.C. 119 of provisional application 61/411,053 file on Nov. 8, 2010 entitled "An Augmented Reality Interface for Video Tagging and Sharing" which is hereby incorporated by reference in its entirety, and is related to seven other simultaneously-filed applications, including U.S. application Ser. No. 13/291,836 entitled "Augmented Reality Interface for Video", U.S. application Ser. No. 13/291,866 entitled "Augmented Reality System for Communicating Tagged Video and Data on a Network", U.S. application Ser. No. 13/291,886 entitled "Augmented Reality System for Position Identification", U.S. application Ser. No. 13/291,903 entitled "Augmented Reality System for Supplementing and Blending Data", U.S. application Ser. No. 13/291,918 entitled "Augmented Reality Virtual Guide System", U.S. application Ser. No. 13/291,930 entitled "Augmented Reality System for Product Identification and Promotion", U.S. application Ser. No. 13/291,951 entitled "Augmented Reality Surveillance and Rescue System", each of which is hereby incorporated by reference in its entirety.

FIELD OF THE INVENTION

The present patent document relates in general to augmented reality systems, more specifically to relating stored images and videos to those currently obtained by an observer's portable electronic device.

BACKGROUND OF THE INVENTION

Modern portable electronic devices are becoming increasingly powerful and sophisticated. Not only are devices running faster CPUs, they're also equipped with sensors that are making these devices more versatile than traditional personal computers. The use of GPS, gyroscopes, accelerometers have made these devices location aware, and opened up a world of possible applications that did not seem possible before.

The standard definition of augmented reality is live direct or indirect viewing of a physical real-world environment whose elements are augmented by virtual computer-generated imagery. Traditionally augmented reality applications have been limited to expensive custom setups used in universities and academia, but with the advent of modem smartphones and powerful embedded processors, many of the algorithms that were once confined to the personal computer world are becoming a part of the mobile world. Layar and AroundMe are examples of two such applications that are increasingly popular and have been ported to many smartphones (Layar is a product of the company Layar, of the Netherlands, and AroundMe is a product of the company Tweakersoft). Both the Layar and AroundMe applications use location data obtained from GPS sensors to overlay additional information such as direction and distance of nearby landmarks.

Typically, augmented reality implementations have relied on three elemental technologies:

(1) Sensing technologies to identify locations or sites in real space using markers, image recognition algorithms, and sensors.

(2) Information retrieval and overlay technologies to create virtual information and to overlay it on top of live images captured by the camera.

(3) Display technologies capable of integrating real and virtual information which includes mobile phone display, projectors, as well as augmented reality glasses.

In addition, mobile augmented reality techniques are roughly classified into two types based on the type of sensing technology used.

A. Location Based Augmented Reality

Location based augmented reality techniques determine the location or orientation of a device using GPS or other sensor, then overlay the camera display with information relevant to the place or direction. The four common sensor platforms used are described below:

GPS: The Global Positioning System provides worldwide coverage and measures the user's 3D position, typically within 30 meters for regular GPS, and about 3 meters for differential GPS. It does not measure orientation. One of the major drawbacks of using GPS based systems is that they require direct line-of-sight views to the satellites and are commonly blocked in urban areas, canyons, etc. This limits their usability severely.

Inertial, geomagnetic, and dead reckoning: Inertial sensors are sourceless and relatively immune to environmental disturbances. Their main drawback however is that they accumulate drift over a period of time. The key to using inertial sensors therefore lies in developing efficient filtering and correction algorithm that can compensate for this drift error.

Active sources: For indoor virtual environments, a common approach is the use of active transmitters and receivers (using magnetic, optical, or ultrasonic technologies). The obvious disadvantage of these systems is that modifying the environment in this manner outdoors is usually not practical and restricts the user to the location of the active sources.

Passive optical: This method relies on using video or optical sensors to track the sun, stars, or surrounding environment, to determine a frame of reference. However most augmented reality applications refrain from using these algorithms since they are computationally intensive.

B) Vision Based Augmented Reality

Vision based augmented reality techniques attempt to model precise descriptions of the shape and location of the real objects in the environment using image processing techniques or predefined markers, and use the information obtained to align the virtual graphical overlay. These techniques may be subdivided into two main categories.

Marker Based Augmented Reality: Marker based augmented reality systems involve recognition of a particular marker called an augmented reality marker with a camera, and then overlaying information on the display that matches the marker. These markers are usually simple monochrome markers and may be detected fairly easily using less complex image processing algorithms.

Markerless augmented reality: Markerless based augmented reality systems recognize a location or an object not by augmented reality markers but by image feature analysis, then combine information with the live image captured by the camera. A well-known example of this image tracking approach is Parallel Tracking and Mapping (PTAM) developed by Oxford University and Speeded Up Robust Features (SURF) which has been recently used by Nokia Research.

Even though these techniques have been deployed and used extensively in the mobile space, there are still several technical challenges that need to be addressed for a robust, usable augmented reality system.

There are three main challenges discussed hereafter:

I. Existing Mobile Rendering APIs are Not Optimal

Existing Mobile 3D solutions are cumbersome and impose limitations on seamless integration with live camera imagery. For complete integration between live camera and overlaid information, the graphics overlay needs to be transformed and rendered in real-time based on the user's position, orientation, and heading. The accuracy of the rendering is important since augmented reality applications offer a rich user experience by precisely registering and orienting overlaid information with elements in user's surroundings. Precise overlay of graphical information over a camera image creates a more intuitive presentation. User experience therefore degrades quickly when accuracy is lost. There have been several implementations that have achieved fast rendering by using OpenGL, or by remote rendering the information and streaming the video to mobile embedded devices. Most modern smartphones have graphics libraries such as OpenGL that use the inbuilt GPU to offload the more computationally expensive rendering operations so that other CPU intensive tasks such as the loading of points of interest are not blocked. However the use of OpenGL on smartphone platforms introduces other challenges. One of the biggest disadvantages of using OpenGL is that once perspective-rendered content is displayed onscreen, it is hard to perform hit testing because OpenGL ES 1.1 does not provide APIs for "picking mode" or "selection" used to determine the geometry at particular screen coordinates. When controls are rendered in a perspective view, it is hard to determine whether touch events lie within the control bounds. Therefore, even though OpenGL supports perspective 3D rendering under the processing constraints typical of modern mobile smartphones, it is not optimal.

II. Real-Time Marker/Markerless Systems are Too Complex

Real-time detection and registration of a frame reference is computationally expensive, especially for markerless techniques. Mapping a virtual environment onto the real-world coordinate space requires complex algorithms. To create a compelling experience, the virtual viewport must update quickly to reflect changes in the camera's orientation, heading, and perspective as the user moves the camera. This makes it essential to gather information about the device's physical position in the environment in real-time. Traditional techniques for frame of reference estimation depend on identifiable markers embedded in the environment or computationally-intensive image processing algorithms to extract registration features. Most of these image processing techniques need to be optimized extensively to fit within the hardware constraints imposed by mobile devices. For closed environments where markers may be placed beforehand, the use of identifiable markers for detection and frame of reference estimation is usually the best viable option. This approach, however, is less suitable for augmented reality applications in outdoor environments since setting up the environment with markers prior to the application's use is unlikely. Attempts to perform real time natural feature detection and tracking on modern mobile devices have been largely intractable since they use large amounts of cached data and significant processing power.

III. Sensor Data for Location Based Systems is Inaccurate

For location based augmented reality systems, especially GPS based systems, sensor noise makes orientation estimation difficult. Modern mobile smartphones contain a number of sensors that are applicable for augmented reality applications. For example, cameras are ubiquitous and accelerometers and geomagnetic sensors are available in most smartphones. Geomagnetic and gyroscope sensors provide information about users headings and angular rate which may be combined with GPS data to estimate field of view and location. However these sensors present unique problems, as they do not provide highly accurate readings and are sensitive to noise. To map the virtual augmented reality environment into a real-world coordinate space, sensor data must be accurate and free of noise that may cause jittering in rendered overlays. The reduction of noise thus represents a significant challenge confronting augmented reality software.

This patent application provides viable approaches to solve these challenges and present a practical implementation of those techniques on a mobile phone. A new methodology for localizing, tagging, and viewing video augmented with existing camera systems is presented. A smartphone implementation is termed "Looking Glass".

SUMMARY OF THE EMBODIMENTS

A system, method, and computer program product for an augmented reality interface are disclosed and claimed herein. Exemplary embodiments may comprise acquiring an image of a real-world scene and metadata with a camera, storing the image and metadata, retrieving at least one stored image with metadata having selected features, manipulating the retrieved image, and combining the manipulated image with a currently observed real-world scene viewed with a portable electronic device. The image may include a still photograph, at least one video frame up to a full video. The image may be in analog or digital format, and may be recorded or live. The image may be communicated in a data stream. The metadata may describe the physical location and orientation of the camera during the acquiring, and may be provided by a GPS system, a gyroscope, and/or an accelerometer. The metadata may be provided by the camera.

The currently observed scene, images, and/or metadata may be stored on a server and/or the portable electronic device. The selected features may include the stored physical location and orientation best matching a current physical location and orientation of the portable electronic device. Alternately, the selected features may include the stored physical location and orientation best matching at least one predicted physical location and orientation of the portable electronic device. The server may search for the selected features, and the retrieved image may be in a second data stream. The portable electronic device may include a smartphone, a hand-held device, the camera, a second camera, a PDA, and/or a tablet computer. The embodiment may manipulate the retrieved image by adjusting image orientation.

The embodiment may superimpose the manipulated image on the currently observed scene, which may involve merging the data stream with the second data stream. The embodiment may combine manipulated imagery by displaying the manipulated image with the portable electronic device in a display or a viewfinder. The method preferably operates continuously and substantially in real time. The method may operate as the currently observed scene changes as the portable electronic device is moved, including translating, tilting, panning, and zooming.

A system embodiment may comprise a processor and a memory containing instructions that, when executed by the processor cause the processor to acquire a video of a real-world scene and metadata with a camera, store the video and metadata, retrieve at least one stored video with metadata having selected features, manipulate the retrieved video, and combine the manipulated video with a currently observed real-world scene viewed with a portable electronic device.

A computer program product embodiment may comprise a computer readable medium tangibly embodying non-transitory computer-executable program instructions thereon that, when executed, cause a computing device to acquire a video of a real-world scene and metadata with a camera, store the video and metadata, retrieve at least one stored video with metadata having selected features, manipulate the retrieved video, and combine the manipulated video with a currently observed real-world scene viewed with a portable electronic device.

In a second embodiment, the metadata may include annotations by a server or a user acquiring the video. The annotations may include details of a person, an object, or a location being photographed. The annotations may help users share their experiences and/or recommended locations. The acquiring and retrieving of imagery may be performed by different persons, including friends or clients for example.

In a third embodiment, the video and metadata may be communicated on at least one network. The retrieving may include pushing the data stream to a network, or pulling the data from a network in response to a request. The network may include a private network or the internet.

In a fourth embodiment, the retrieved video may be compared with the currently observed real-world scene to enable navigation. The embodiment may visually verify a real-world path or a real-world destination for a portable electronic device user.

In a fifth embodiment, the manipulated video may be combined with at least one historical image and a currently observed real-world scene viewed with a portable electronic device. This embodiment thus may place the user in a historically-based reality, to for example assist in educating the user on historical events.

In a sixth embodiment, guide information related to the selected features is provided. The guide information may include historical information and/or current information. The guide information may include a virtual tour with commentary regarding identified landmarks, museum exhibits, real properties for sale, and/or rental properties. Access to the guide information may be provided as a fee-based service.

In a seventh embodiment, commercial information regarding the selected features is provided. The selected features may include goods or services available commercially. The commercial information may include a recommendation, a review, a promotion, an advertisement, a price, an online vendor, a local vendor, a descriptive differentiation presentation, or a UPC.

In an eighth embodiment, the metadata may include descriptive data relating to at least one of surveillance and rescue. For example, the metadata may include at least one of the position and orientation of an item of police evidence. The metadata may also include information relating to a lost child, an invalid, an elderly person, or a medical emergency.

As described more fully below, the apparatus and processes of the embodiments disclosed provide an augmented reality interface. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

BRIEF DESCRIPTION OF THE DRAWINGS

FIG. 2 depicts the basic algorithm for filtering a compass heading according to an embodiment;

DETAILED DESCRIPTION OF EXEMPLARY EMBODIMENTS

Figure 1:
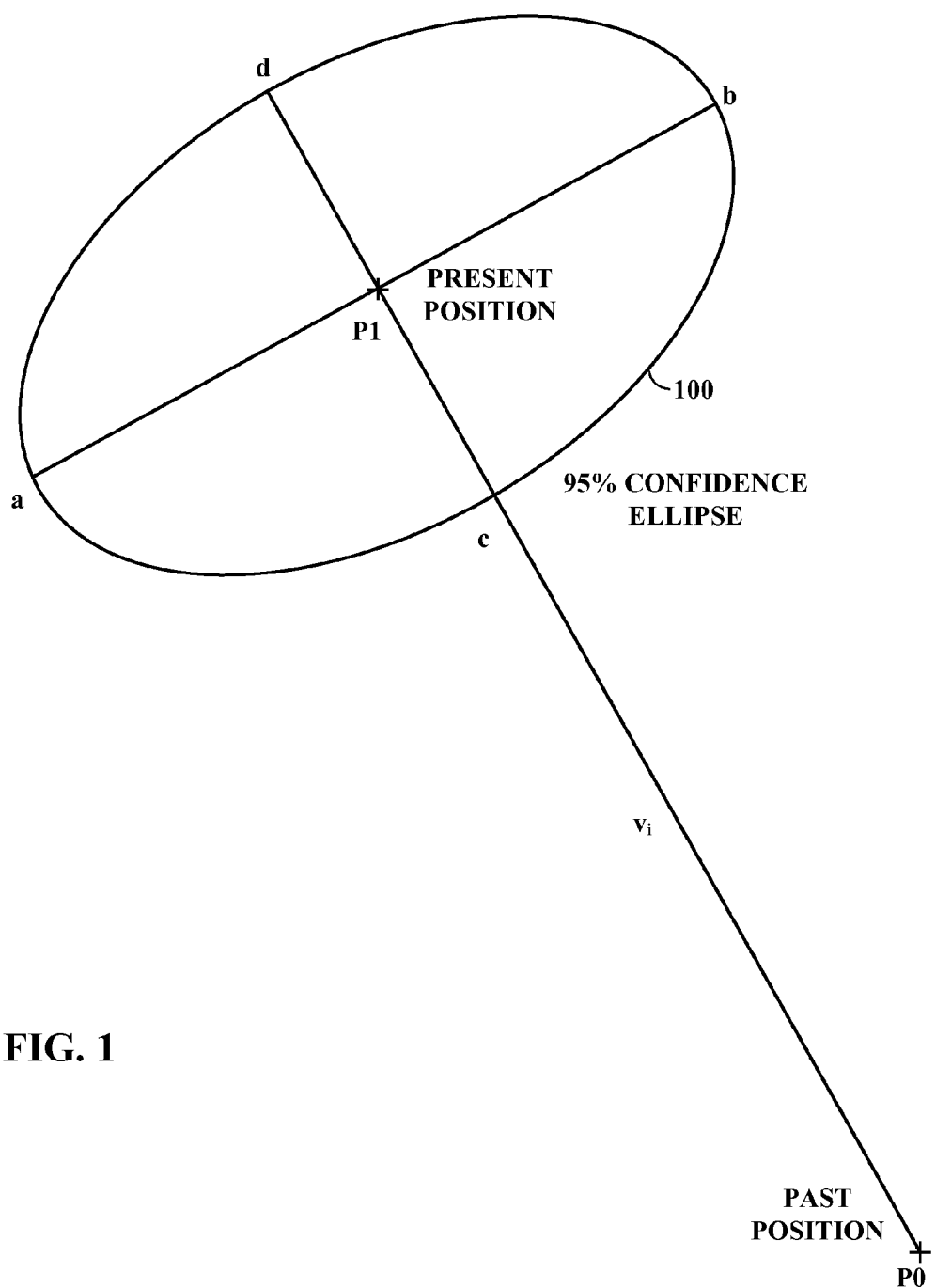
FIG. 1 depicts a depicts a position confidence ellipse using dead reckoning.

The challenges mentioned above are now addressed, and implementations of the present invention tackle each of the three challenges specifically. Existing mobile rendering APIs are not optimal; they impose certain intractable limitations on the interaction between the live and augmented view. To mitigate these issues, the implementations of the present invention rely on simple scene graphs based on a nested view approach to render the content overlay. Each view has a 4×4 visual transformation matrix, which supports basic perspective rendering. The transformation matrix is applied to graphics output when each view draws its respective content, and is also applied to user interaction events as they are passed into the view stack. The created transformation matrix approximates the perspective distortion caused by the camera movement, and applies the transformation to all views within the nested tree. This enables easy rendering of interactive buttons on the screen, and precludes the need to use other graphics libraries, such as OpenGL. It also enables user interaction with rendered content, which is important for mobile augmented reality applications. Most mobile APIs provide view/widget nesting mechanisms as well as custom APIs for manipulating transform matrices. This technique therefore provides the most flexibility for most augmented reality applications since at any given time there are not many transformations that need to be handled. However, it must be noted that as the complexity of the rendering increases, there will be a marked decrease in performance since all the transformations are being done in software.

To test this approach, this nested view transformation was implemented on the iPhone 4 (iPhone is a registered trademark of Apple Computer, Inc.). Tests showed that up to 23 different separate views may be shown on the screen without any performance degradation. As a result of this investigation, it was determined that most mobile APIs, such as those for Android (Android is a trademark of Google, Inc.) and more recently iPhone SDK 4.1, the video data may be exposed and nested in views using the same technique. This allows the implementation of an augmented reality application which not only augments the live camera imagery with graphics or text, but another live or recorded video.

Another one of the challenges discussed earlier was the computational complexity involved in identifying frames of reference and correspondence. This is one of the most crucial aspects of augmented reality technologies. Using markers certainly solves the frame of reference issue. However, it is impractical for most mobile augmented reality applications since it requires customized markers to be placed. Markerless approaches attempt to solve these issues by using CPU intensive image recognition algorithms to identify features which may be used to determine a frame of reference, location and position of the virtual overlay with respect to the live camera image. These techniques however, are impractical on most mobile devices since they have limited CPUs. On the other hand, using GPS sensors to locate position works for most cases and most modern smart phones are equipped with GPS as well as digital compass sensors. The drawback of using these sensors is that they are susceptible to noise and GPS sensors cannot be used indoors which severely limits their use for indoor applications.

It is clear that none of the techniques on their own may be used to create a complete augmented reality system that works in all scenarios. Therefore, these limitations were addressed by using a hybrid approach. Embodiments of the present invention use a combination of GPS sensor, digital compass, gyroscope information as well as a modified markerless feature tracking algorithm to achieve real time image registration and location estimation that may be used in any scenario. These techniques were implemented as an iPhone 4 application, since it provides the best combination of sensors that are required for this approach.

The iPhone 4 contains AGD1 which is a 3 axis gyroscope/accelerometer as well as a magnetic sensor which provides directional information. It also contains a GPS chip. Recent studies using the iPhone 4 SDK have shown the background location notification for the GPS has an accuracy of approximately 500 meters and an active accuracy of around 30 meters when there is a full signal lock. This is a pretty large range, therefore to get a more refined and consistent location information, the embodiments of the present invention combine the information from the digital compass as well as the gyroscope information to determine if a user was moving, and used the directional as well as the movement data to approximate location within a 500×500 meter grid. The use of 3-axis gyros to determine location is not new and is used in most inertial navigation systems. This technique is usually referred to as dead reckoning.

Dead reckoning is the process of estimating present position by projecting heading and speed from a known past position. The heading and speed are combined into a movement vector representing the change of position from a known position, P0, to an estimated position, P1. The accuracy of this estimation may be quoted as a confidence ellipse whose population mean is in the ellipse 95% of the time. The axes of the ellipse are determined by the accuracies of the heading detection and speed measurement. This is illustrated in FIG. 1, which depicts a position confidence ellipse 100 using dead reckoning.

A user moving from point P0 to point P1 may be described as being within the 95% confidence ellipse 100 centered on P1 with axes ab, determined by the heading sensor accuracy, and cd, determined by the speed sensor accuracy. While the uncertainty of a single reading may be described this way, the uncertainty of multiple readings is calculated as the cumulative sum of the uncertainty on all readings since the last precisely known position. This is simply expressed in the equation $$Pn = P0 + \sum_{i=0}^{i=n} (vi + ve)$$

where n is the number of dead reckoning calculations since P0, $P_n$ is the current position, and $v_e$ is the error vector for each calculation.

Assuming a straight path, the resultant confidence ellipse after n iterations has axes of dimension n×ab and n×cd, or more simply, in the worst case these ellipses grow linearly with travel distance. Clearly the accuracy of the sensors is critical to the confidence that may be placed in position estimation using dead reckoning. Unfortunately the sensors on most mobile smart phones are inaccurate and are severely impacted by noise. As a result a number of noise filtering algorithms were investigated, including Kalman filter based dead reckoning, and the Savitzky-Golay smoothing filter, however none of these seemed suitable for real time performance on mobile phone systems. It was finally decided to implement a finite impulse response filter, a method proposed by J. Benjamin Gotow et al. They recently proved that an adapted FIR filter may be used successfully on iPhone as well as Android phones with acceptable accuracy. In addition, the more advanced Savitzky-Golay smoothing filter may be applied offline by uploading the raw sensor data to a backend server which may run the data and then provide corrections to algorithm periodically. FIG. 2 outlines the basic algorithm for filtering compass heading.

Figure 3:
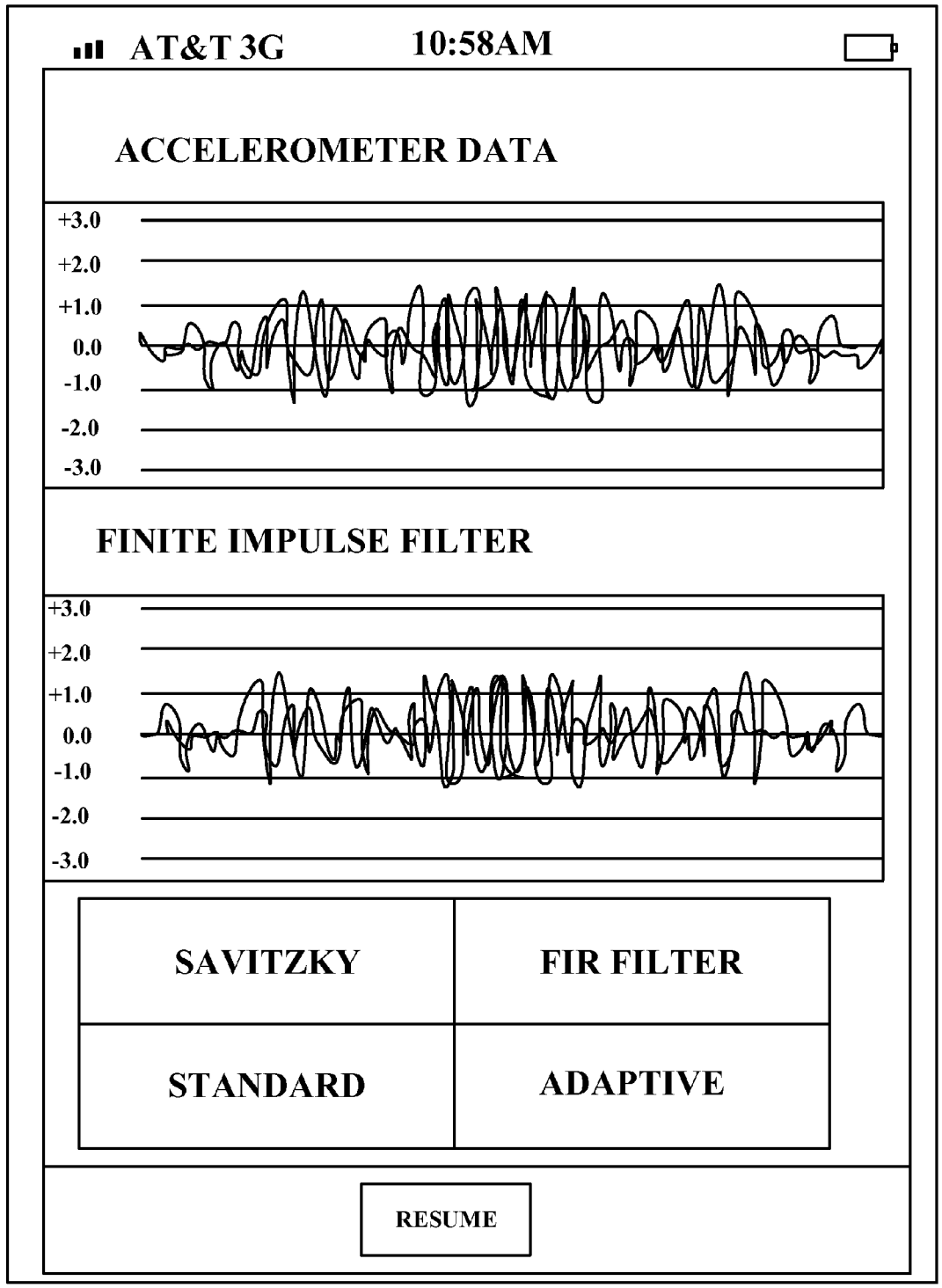
FIG. 3 depicts the results of the filtering algorithm on raw sensor data within an iPhone implementation according to an embodiment.

FIG. 3 shows the results of the filtering algorithm on raw sensor data within an iPhone implementation. In this accelerometer filter implementation, different colors (not shown) may be used to represent accelerations in different orthogonal axes.

In the preferred embodiment, this technique allows users to record video and tag it with its current location. This tag contains additional metadata that is uploaded to a server and is associated with video file. The format of the metadata not only contains longitude, latitude, and heading data but also grid coordinates that are calculated based on the location estimation obtained once the GPS coordinates match and the dead reckoning algorithm kicks in. This grid based approach to data storage and point of interest retrieval has several benefits. In areas where there are a large number of points of interest, such as cities, retrieving and caching a large number of geotagged points becomes difficult. As the user moves, the system has to continuously query its backend server to update the nearest points of interest.

Unfortunately, there are several problems with this straightforward approach. First of all, such a system is not scalable, as the number of users increase querying the database constantly severely degrades performance. A different approach is needed to avoid the execution of expensive database queries. Requesting and retrieving data on a mobile smartphone is also problematic as continuous network connectivity quickly depletes the battery, and constantly uploading to and retrieving data from servers may adversely affect the frame rate of the application. One way to solve this issue is to cache the data based on approximate geolocations which are divided and stored as indexed grid coordinates in the database.

Figure 4:
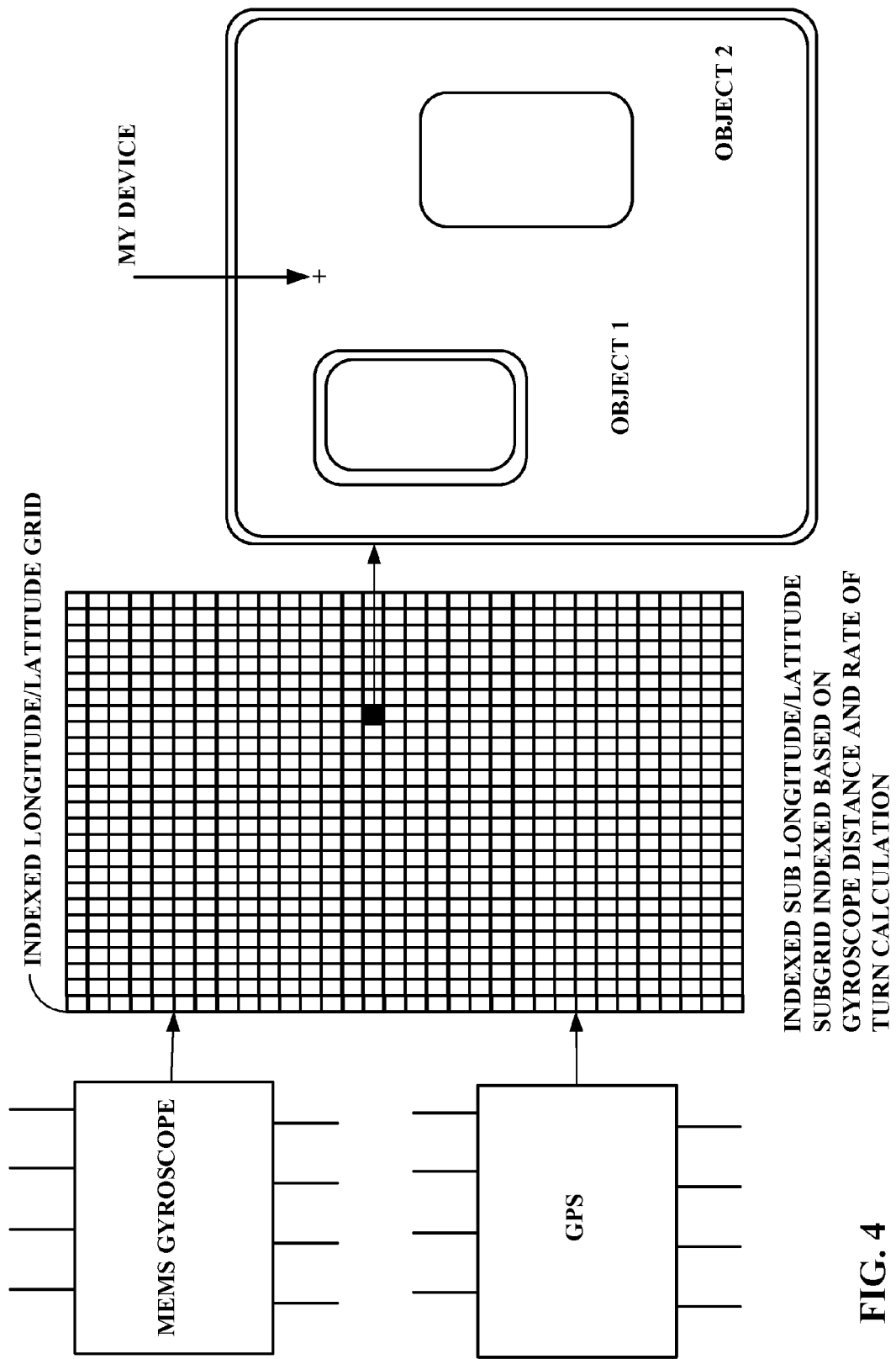
FIG. 4 depicts grid based location querying to retrieve and upload virtual content according to an embodiment.

FIG. 4 depicts grid based location querying to retrieve and upload virtual content. This grid based approach provides a scalable approach for information retrieval and caching for mobile devices. It progressively loads contents from a server based on GPS coordinates. A hash function places each point denoted by its latitude/longitude and sub grid location based on accelerometer data into an indexed two-dimensional grid.

Each longitude/latitude square in the grid contains all points within a specific geographical area, and may be loaded by querying the database for the indexed coordinate values. Each square is further subdivided into the 50×50 grid, each of which indexes a location roughly 10 square meters. This grid is indexed based on approximate location within a single longitudinal/latitudinal grid which is based on information obtained from the filtering of the gyroscope data. Indexing the contents of the database using discretized latitude and longitude values obviates the need for numeric comparison and queries bounded by latitude and longitude values. Queries may specify an exact block index and retrieve a group of points within a predefined geographic area.

There are several advantages of dividing content into a grid and retrieving it on block by block basis. Information may be retrieved and cached using just indexes. Each content item may be uniquely identified with 4 index numbers, two specifying its longitude/latitude square and two specifying its sub-grid position. This alleviates the need for complex retrieval queries on a central server. Caching retrieved data is also straightforward since data may be stored and retrieved on the device based on the block index. Purging cached data based on its distance from the user's current location does not require iterating through each cached point. Instead, entire blocks may be quickly deleted from the cache by using the discrete grid indexes. In addition, filtering blocks of points is much more efficient than processing each point and also requires constant evaluation time, regardless of the number of points present in the area.

In addition to using accurate location information, embodiments of the present invention enhance the accuracy of the frame of reference by analyzing the individual camera frame for natural features. There has been considerable research in markerless augmented reality algorithms; techniques such as PTAM, SURF, and SIFT have all been proven to be efficient descriptors for augmented reality applications in mobile devices. However all of these techniques are usually used on their own and therefore are not suitable for hybrid techniques such as those needed for implementations of the present invention which needs to calculate and filter location data, as well as extract image features all at the same times without decreasing the real time performance of the system. Therefore a simpler image descriptor is required, which may be calculated efficiently on a mobile device.

Recently, Edward Rosten et al presented a fast, efficient corner detection algorithm called FAST, which stands for Features from Accelerated Segment Test. The feature detector considers pixels in a Bresenhams circle of radius r around the candidate point. If n contiguous pixels are all brighter than the nucleus by at least given threshold value t or all darker than the nucleus by given threshold value t, then the pixel under the nucleus is considered to be a feature. Although r can in principle take any value, only a value of 3 is used (corresponding to a circle of 16 pixels circumference), and tests show that the best value of n is 9. This value of n is the lowest one at which edges are not detected. The resulting detector produces very stable features. Additionally, FAST uses the ID3 algorithm to optimize the order in which pixels are tested, resulting in the most computationally efficient feature detector available. ID3 stands for Iterative Dichotomiser 3, an algorithm used to generate a heuristic decision tree. It is an approximation algorithm that relies on Occam's razor rule to form the decision tree.

The ID3 algorithm may be summarized as follows:
1. Take all unused attributes and count their entropy concerning test samples
2. Choose attributes for which entropy is minimum (or, equivalently, information gain is maximum)
3. Make a node containing that attribute In embodiments of the present invention, uploaded video on the server is analyzed for corners features. The entropy in this case is defined as the likelihood that the current pixel being analyzed is part of a corner. This likelihood is calculated based on the intensity of the current pixel with respect to its neighboring pixels. Fast corner features are also extracted for each camera image at every frame and matched against those retrieved from the database. A signed distance metric is used to correct frame orientation and position to best align the virtual view with live camera imagery.

The implementation of the hybrid augmented reality algorithm detailed in the previous section is now presented. "Looking Glass" is an augmented reality based video tagging and sharing application. As mentioned before, the choice of platform was the iPhone 4, as it contained a 3 direction gyro and a stable SDK which made the implementation easier. However it should be noted that these same techniques may be easily ported to Android or any other CE platform as well, as long as they have a hardware profile similar to that of the iPhone 4G.

Figure 5:
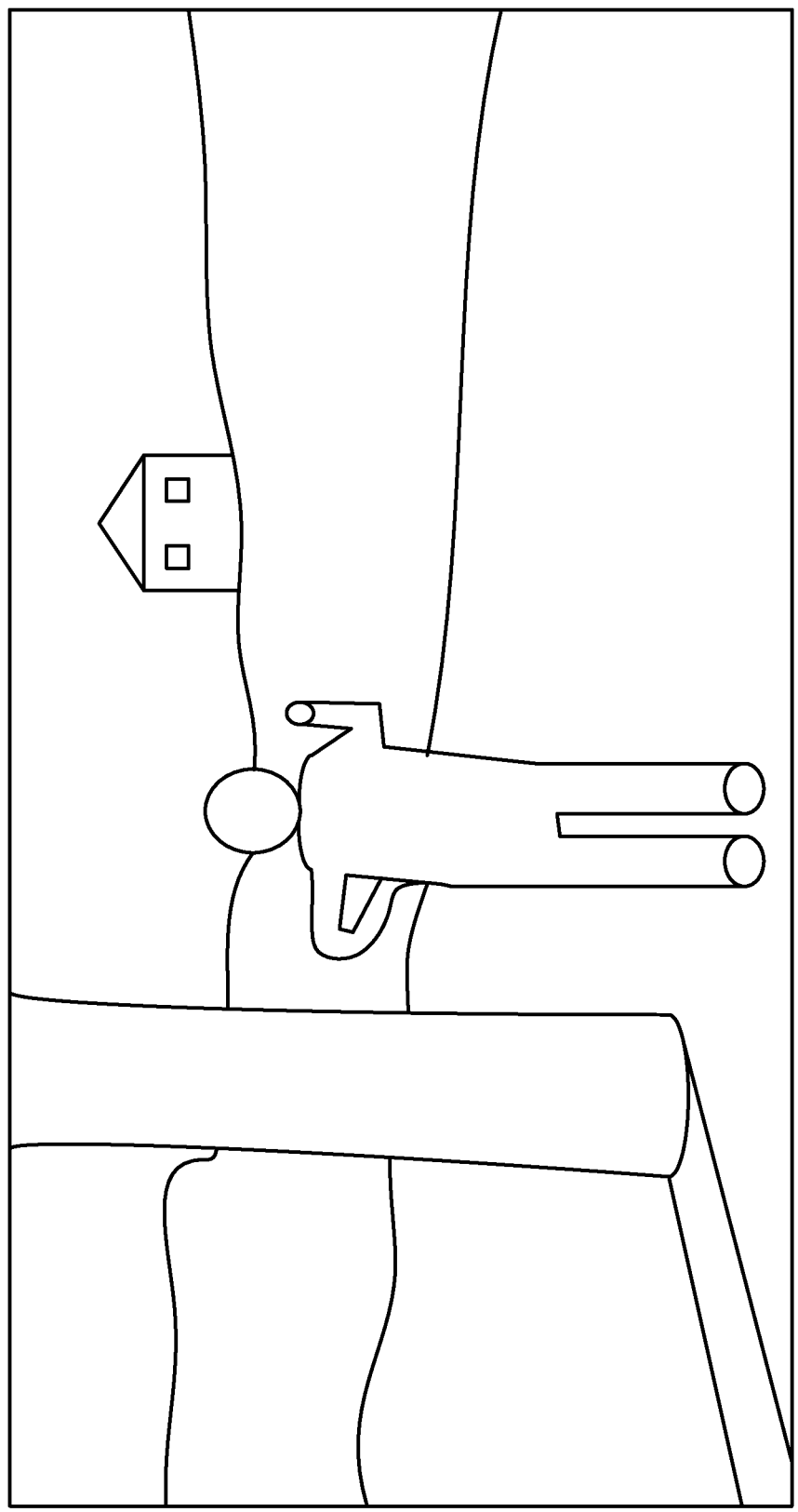
FIG. 5 depicts a scene that a user wants to tag and upload to a server according to an embodiment.
Figure 6:
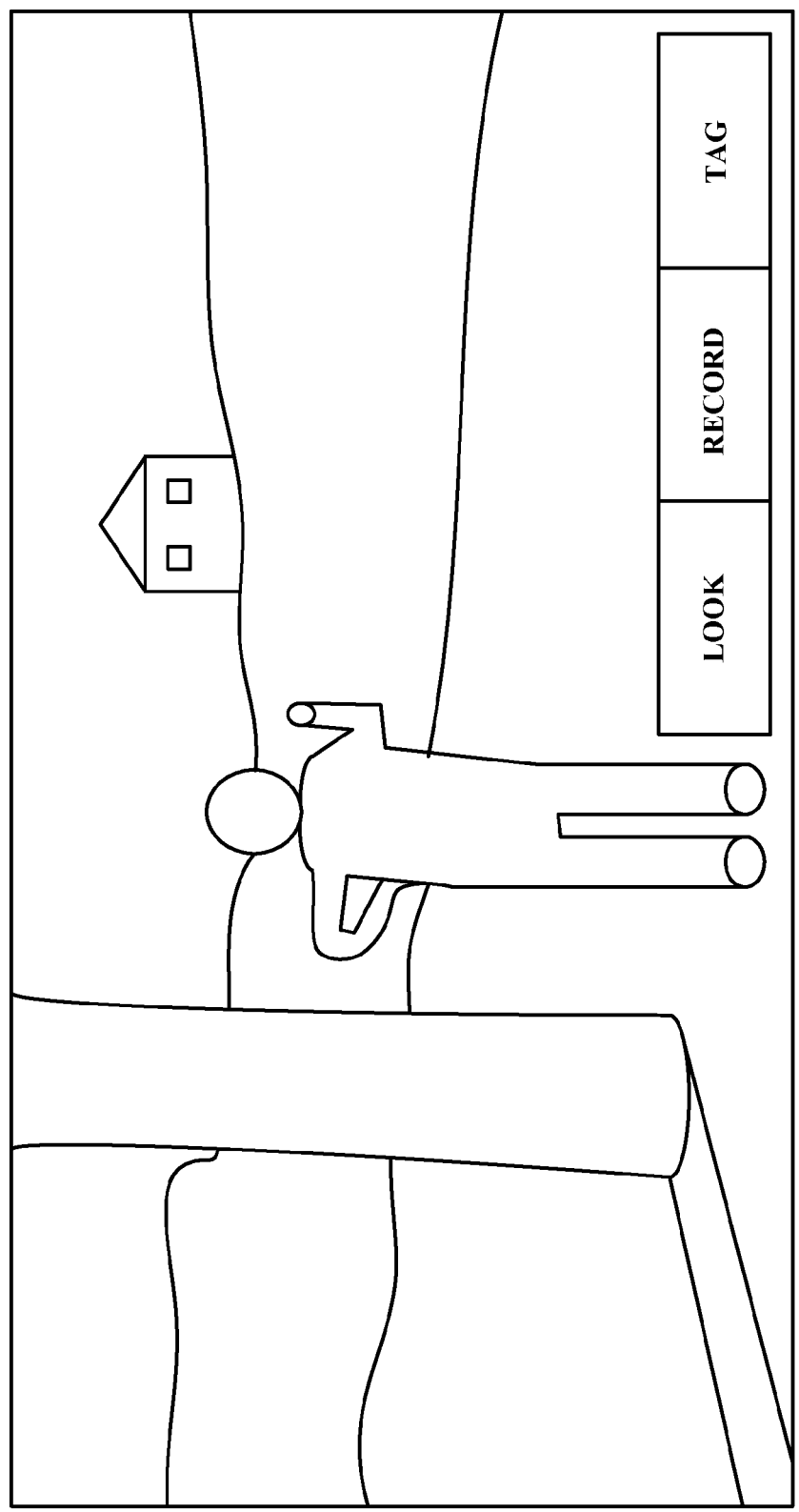
FIG. 6 depicts an interface for recording, tagging, and uploading a video of a scene according to an embodiment.

The application may be divided into three distinct stages:

In the first stage, the user may record and tag any video taken from an iPhone 4 with location, orientation and gyroscope data obtained from the GPS coordinates and the gyroscope filtering. This additional information is stored in a special binary file and associated with each video. Users may record video within the application itself and tag it with description or comments. When the user is finished, the application collates the location and gyroscope information along with the tag information and sends it to the backend server. FIGS. 5 and 6 depict a scene that a user wants to tag and upload to a server, and the iPhone application interface for recording, tagging, and uploading a video of the scene, respectively. The user-tagged videos may include annotations providing details on a given person, an object of interest, or a location being photographed. These annotations may help a user share experiences and recommended locations to visit. Multiple users may acquire and retrieve videos with each other, such as friends or clients for example.

Figure 7:
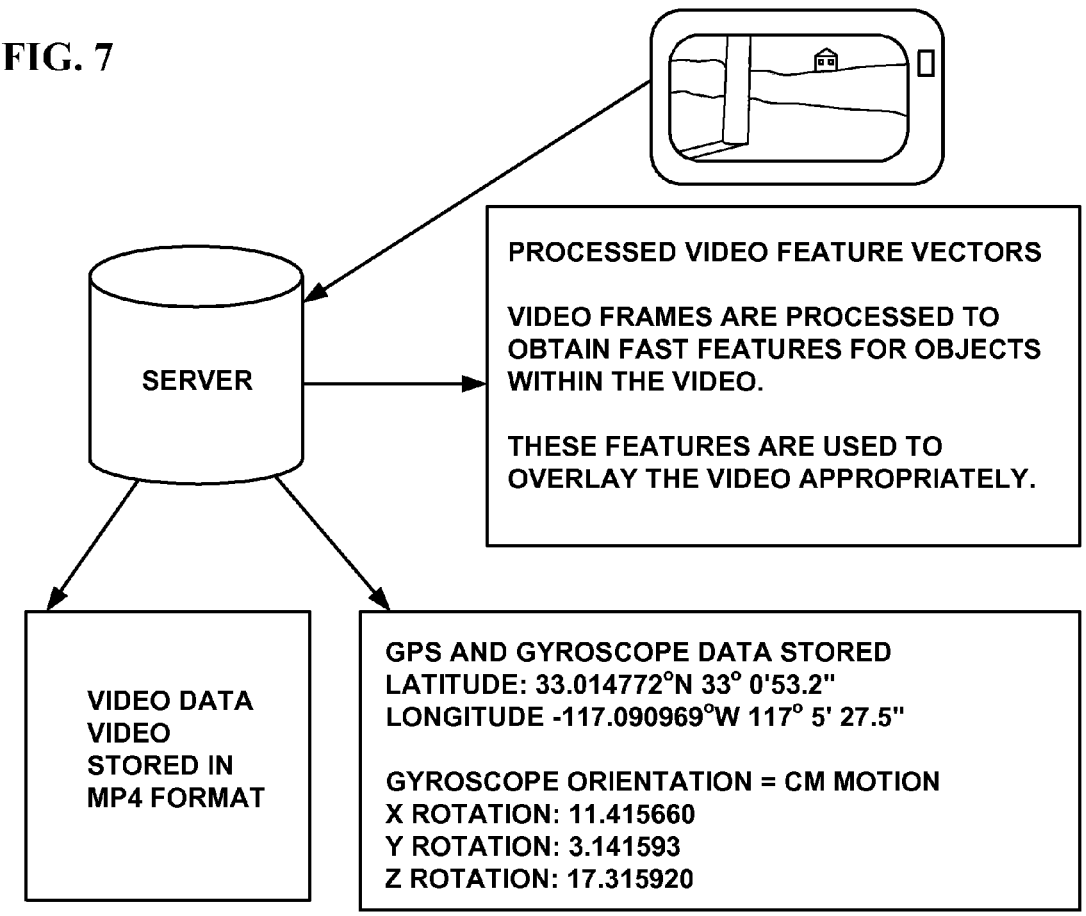
FIG. 7 depicts that metadata is uploaded from a device to a server that contains both video data as well as additional location metadata according to an embodiment.

In the second stage, the tagged videos are uploaded either during the next time the device is connected to a personal computer or when it connects to a Wifi network. Both the video as well as the metadata file are sent to the server. The server annotates the metadata file with additional information that is obtained by analyzing the video frames. Each video snippet may be sampled at 10 second intervals and from those samples FAST (Features from Accelerated Segment Test) features are obtained; these features may be used later to provide image registration information to assist overlay. FIG. 7 depicts that metadata is uploaded from the phone to a server that contains both user video data as well as additional location metadata.

Figure 8:
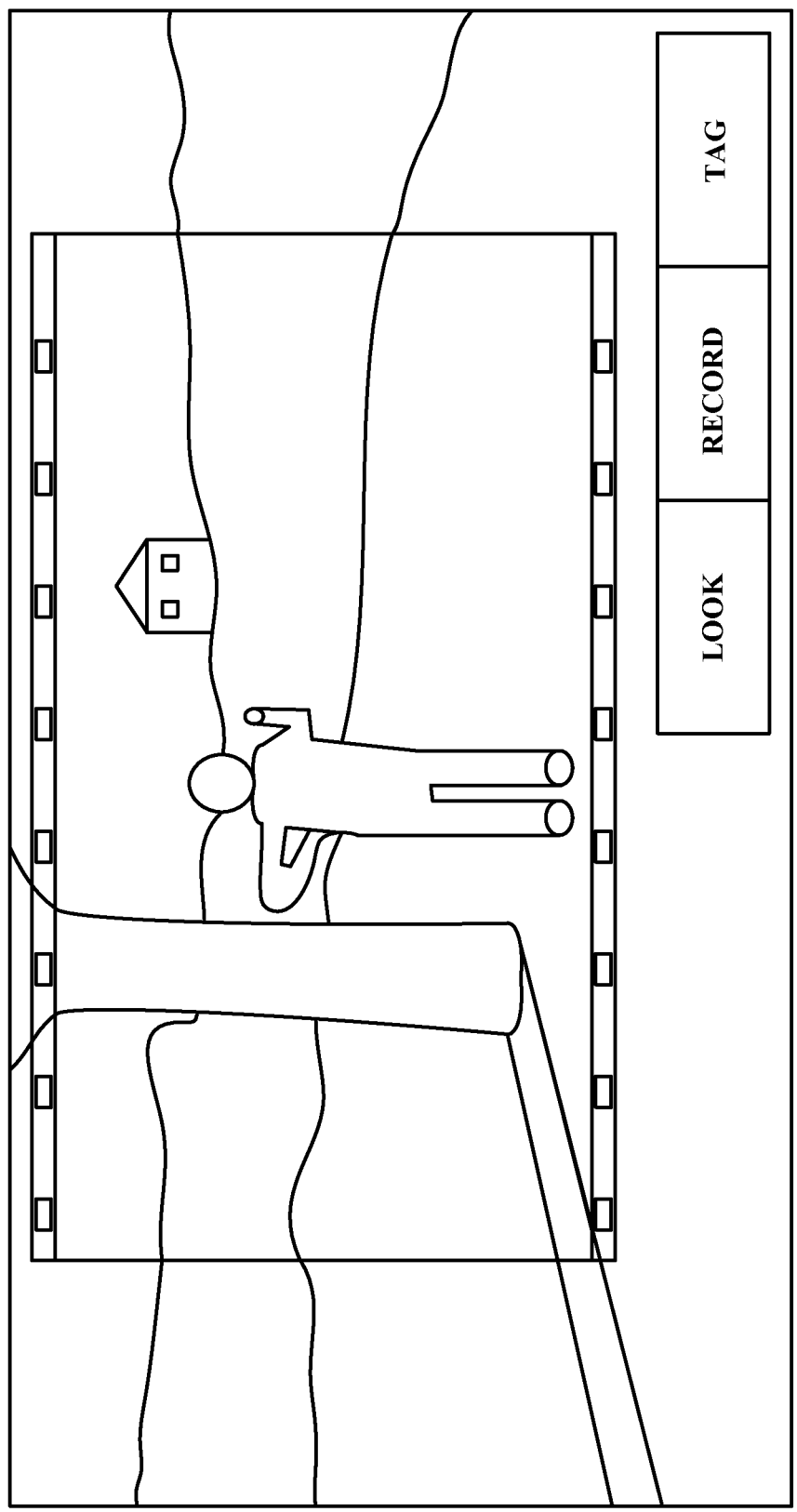
FIG. 8 depicts how a live camera image is augmented with user video which may be either streamed or pre-downloaded based on user position and orientation according to an embodiment.

FIG. 8 depicts how a live camera image is augmented with user video, which may be either streamed or pre-downloaded. The third stage of the methodology involves buffering the video snippets from the server to the user interface based on location and orientation information. Given the current location of the device, the server may determine the videos that will be within the device's view and preload the smaller video snippets. As the user pans the camera thru the physical space, the identified video snippets are overlaid in the location and direction at which they were originally tagged. Once the user stops panning, the FAST corner features of the current frame are matched with the tagged video snippet and the video overlay is adjusted to match the view and adjust that position of the overlay as the device moves in physical space.

This patent application describes the various approaches by which augmented reality systems are implemented and a hybrid mechanism to build a viable, practical augmented reality system which can run efficiently on a modem high end mobile device. The challenges in implementing a robust, scalable system are identified, and applicable solutions to overcome those issues are presented. The current work being done in hybrid techniques is extended by using a combination of markerless image processing techniques and location based information.

The techniques were tested by implementing a novel augmented reality application on the iPhone 4 which allows user to record, share and view user generated videos using an augmented reality interface. The popularity of websites such as YouTube and Facebook has made the creation and sharing of user generated videos mainstream. However the viewing and sharing of these videos have still been limited to the grids and lists of the traditional personal computer user interface. The "Looking Glass" tool presents an interface where the physical world around us is tagged with videos and allows users to see it by just focusing on it.

Further, the embodiments of the present invention enable the user to augment the physical real world environment with user generated videos. The augmented reality interface described makes video available based on location, enabling sharing and viewing videos across the physical space. By implementing an efficient algorithm on a mobile device, such an application could easily be embedded not only on mobile phones but other CE devices such as still and video cameras, and tablet devices. Such a system may provide value added features along with the photos, videos, and even live streams that may be tagged.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the augmented reality interface described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A computer-implemented method for providing an augmented reality interface, comprising:

retrieving, from a server, and caching data associated with a plurality of locations within a two-dimension grid based on a GPS coordinate of a portable electronic device, the cached data comprises a plurality of image snippets preloaded from the server based on a location information of the portable electronic device, each of the plurality of image snippets being a smaller image file of a corresponding stored image;

overlaying one or more of the plurality of image snippets corresponding to a location and a direction at which a corresponding image was originally captured based on the location information and an orientation information of the portable electronic device without manipulating the plurality of image snippets based on corner features of the image of the real-world scene;

identifying at least one retrieved image with metadata having selected features;

manipulating a retrieved image corresponding to an displayed image snippet based on matching corner feature information of the retrieved images generated and provided by the server and corner features of a currently observed real-world scene; and combining the manipulated image with the currently observed real-world scene viewed with the portable electronic device, wherein the metadata includes annotations by at least one of the server and a user who acquired the image; and wherein the cache data is purged based on a distance between the portable electronic device from the two-dimension grid.

2. The method of claim 1, wherein the annotations include details of at least one of a person, an object, and a location being photographed.

3. The method of claim 1, wherein the annotations help users share at least one of experiences and recommended locations.

4. The method of claim 1, wherein the retrieved image is at least one of a still photograph, at least one video frame, analog, digital, recorded, live, and communicated in a data stream.

5. The method of claim 1, wherein the metadata describes the physical location and orientation of the camera during the acquiring, and is provided by at least one of a GPS system, a gyroscope, and an accelerometer.

6. The method of claim 1, wherein at least one of the currently observed scene, images, and metadata are stored on at least one of a server and the portable electronic device.

7. The method of claim 1, wherein the selected features include the stored physical location and orientation best matching one of (a) a current physical location and orientation of the portable electronic device and (b) a predicted physical location and orientation of the portable electronic device.

8. The method of claim 1, wherein the server searches for the selected features.

9. The method of claim 1, wherein the retrieved image is in a second data stream.

10. The method of claim 1, wherein the portable electronic device is at least one of a smartphone, a hand-held device, the camera, a second camera, a PDA, and a tablet computer.

11. The method of claim 1, wherein the manipulating includes adjusting image orientation.

12. The method of claim 1, wherein the combining includes superimposing the manipulated image on the currently observed scene.

13. The method of claim 1, wherein the combining includes merging a first data stream comprising the image of the currently observed real-world scene with a second data stream comprising the retrieved image.

14. The method of claim 1, wherein the combining includes displaying the manipulated image with the portable electronic device in one of a display and a viewfinder.

15. The method of claim 1, wherein the method operates continuously and substantially in real time.

16. The method of claim 1, wherein the method operates as the currently observed scene changes as the portable electronic device is moved, such motion including at least one of translating, tilting, panning, and zooming.

17. A system for providing an augmented reality interface, comprising:
a processor; and
a memory containing instructions that, when executed by the processor cause the processor to:
retrieve, from a server, and cache data associated with a plurality of locations within a two-dimension grid based on a GPS coordinate of a portable electronic device, the cached data comprises a plurality of video snippets preloaded from the server based on a location information of the portable electronic device, each of the plurality of video snippets being a smaller video file of a corresponding stored video;
overlay one or more of the plurality of video snippets corresponding to a location and a direction at which a corresponding video was originally captured based on the location information and an orientation information of the portable electronic device without manipulating the plurality of video snippets based on corner features of the video of the real-world scene;
identify at least one retrieved video with metadata having selected features;
manipulate a retrieved video corresponding to an displayed video snippet based on matching corner feature information of the retrieved videos generated and provided by the server and corner features of a currently observed real-world scene; and
combine the manipulated video with the currently observed real-world scene viewed with the portable electronic device,
wherein the metadata includes annotations by at least one of the server and a user who acquired the video; and
wherein the cache data is purged based on a distance between the portable electronic device from the two-dimension grid.

18. A computer program product for providing an augmented reality interface, comprising a non-transitory computer readable medium embodying computer-executable program instructions thereon that, when executed, cause a computing device to:
retrieve, from a server, and a plurality of videos and cache data associated with a plurality of locations within a two-dimension grid based on a GPS coordinate of a portable electronic device, the cached data comprises a plurality of video snippets from the server based on a location information of the portable electronic device, each of the plurality of video snippets being a smaller video file of a corresponding stored video;
overlay one or more of the plurality of video snippets corresponding to a location and a direction at which a corresponding video was originally captured based on the location information and an orientation information of the portable electronic device without manipulating the plurality of video snippets based on corner features of the video of the real-world scene;
identify at least one retrieved video with metadata having selected features;
manipulate a retrieved video corresponding to an displayed video snippet based on matching corner feature information of the retrieved videos generated and provided by the server and corner features of a currently observed real-world scene; and
combine the manipulated video with the currently observed real-world scene viewed with the portable electronic device,
wherein the metadata includes annotations by at least one of the server and a user who acquired the video; and
wherein the cache data is purged based on a distance between the portable electronic device from the two-dimension grid.

19. A system for providing an augmented reality interface, comprising:
means for retrieving, from a server, and a least one stored video caching data associated with a plurality of locations within a two-dimension grid based on a GPS coordinate of a portable electronic device, the cached data comprises a plurality of video snippets preloaded from the server based on a location information of the portable electronic device, each of the plurality of video snippets being a smaller video file of a corresponding stored video;
means for overlaying one or more of the plurality of video snippets corresponding to a location and a direction at which a corresponding video was originally captured based on the location information and an orientation information of the portable electronic device without manipulating the plurality of video snippets based on corner features of the video of the real-world scene;

means for identifying at least one retrieved video with metadata having selected features;

means for manipulating the retrieved video corresponding to an displayed video snippet based on matching corner feature information of the retrieved videos generated and provided by the server and corner features of a currently observed real-world scene; and means for combining the manipulated video with the currently observed real-world scene viewed with the portable electronic device, wherein the metadata includes annotations by at least one of the server and a user who acquired the video; and wherein the cache data is purged based on a distance between the portable electronic device from the two-dimension grid.

* * * * *

UNITED STATES PATENT AND TRADEMARK OFFICE
CERTIFICATE OF CORRECTION

| | |
|---|---|
| PATENT NO. | : 9,280,849 B2 |
| APPLICATION NO. | : 13/291851 |
| DATED | : March 8, 2016 |
| INVENTOR(S) | : Adhikari et al. |

It is certified that error appears in the above-identified patent and that said Letters Patent is hereby corrected as shown below:

In the SPECIFICATION:
In the CROSS-REFERENCE TO RELATED APPLICATIONS:
Column 1, line 8, delete "file" and insert --filed--.
In the CLAIMS:
Claim 19, column 14, line 57, delete "a least" and insert --at least--.

Signed and Sealed this
Nineteenth Day of July, 2016

Michelle K. Lee
*Director of the United States Patent and Trademark Office*